Sept. 28, 1937. T. J. UMPHRES 2,094,506
DERRICK PIPE RACK
Filed April 9, 1937 2 Sheets-Sheet 1
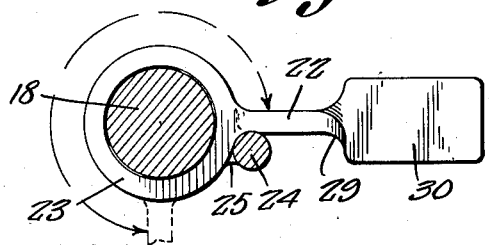
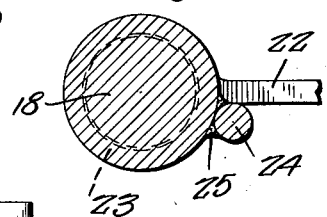
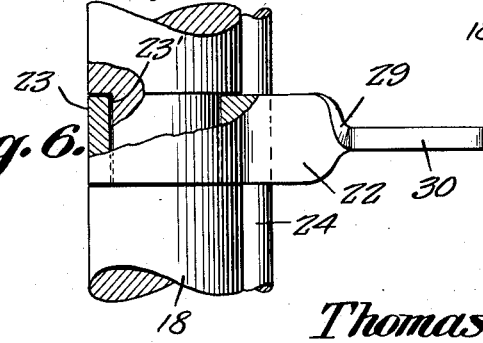
Thomas J. Umphres,
INVENTOR Sept. 28, 1937.   T. J. UMPHRES   2,094,506
DERRICK PIPE RACK
Filed April 9, 1937   2 Sheets-Sheet 2
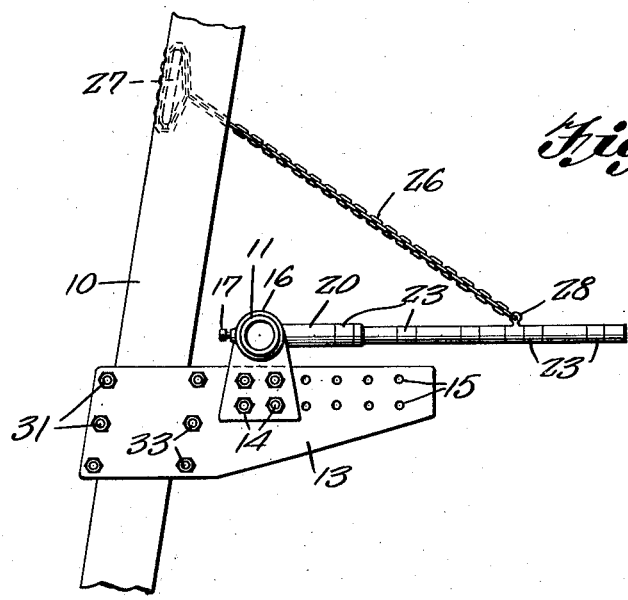
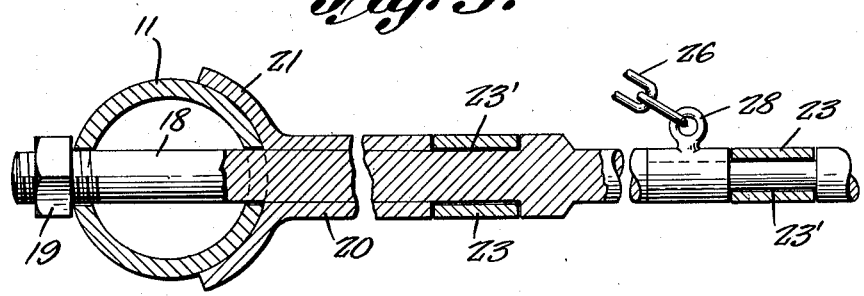
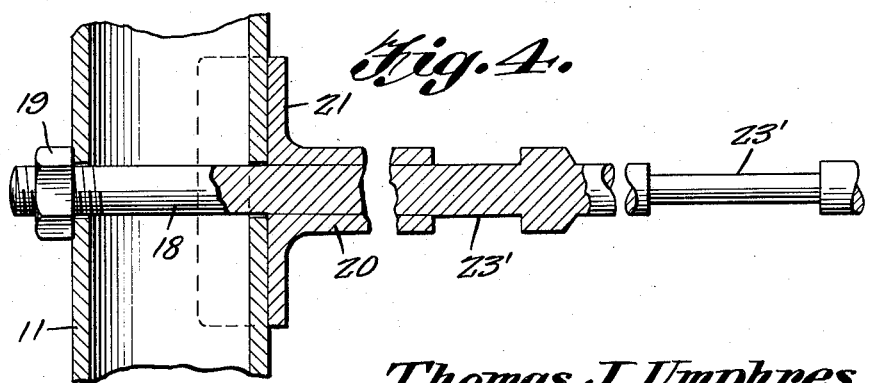

Patented Sept. 28, 1937

2,094,506

UNITED STATES PATENT OFFICE 2,094,506

DERRICK PIPE RACK

Thomas J. Umphres, George West, Tex.

Application April 9, 1937, Serial No. 136,018

4 Claims. (Cl. 211—60)

This invention relates to derrick pipe racks and has for an object to provide a rack in which the pipe coming out of the well as well as going back into the well may be racked in minimum time and with minimum labor.

A further object is to provide a device of this character having dogs on the fingers of the rack adapted to latch each pipe in place as it is placed in the rack, the dogs being selectively operable to latch several pipes simultaneously should it not be desired to latch each pipe separately.

A further object is to provide a derrick pipe rack which will be hinged to the derrick so that it may be pushed back out of the way when it is not needed.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a cross sectional view of a portion of a derrick showing in top plan a pipe rack constructed in accordance with the invention.

Figure 2 is a fragmentary side elevation of the derrick showing the pipe rack in operative position.

Figure 3 is a longitudinal sectional view of one of the fingers.

Figure 4 is a longitudinal sectional view of the fingers taken in a plane at a right angle to Figure 3.

Figure 5 is a detail cross sectional view showing one of the dogs.

Figure 6 is a plan view of the dogs shown in Figure 5.

Figure 7 is a detail sectional view showing the finger and the rod welded thereto for supporting the dogs.

Referring now to the drawings in which like characters of reference designate similar parts in the various views, 10 designates the legs of a derrick. In carrying out the invention a pipe 11 is journaled near its ends in bearings 12 that are adjustably secured to brackets 13 carried by the derrick legs, by bolts 14 that are interchangeably received in bolt openings 15 in the brackets. The pipe is held against endwise movement with relation to the bearings through the medium of collars 16, best shown in Figure 1, secured to the pipe by set screws 17 and contacting the outer ends of the bearings.

Steel fingers 18 are secured at the end to the pipe and extend in a common direction therefrom. The fingers are relatively spaced a predetermined distance apart and pass through the pipe, and are secured against endwise movement with relation to the pipe by means of nuts 19 and sleeves 20, the latter having curved portions 21 embracing the pipe, as best shown in Figure 3. The sleeves are welded to the fingers and the nuts when tightened clamp the fingers rigidly to the pipe 11.

Dogs 22 are provided with sleeves 23 which are received in grooves 23', best shown in Figure 6, upon the fingers and pivotally mount the dogs for movement on the fingers into operative or inoperative position. When in operative position the dogs are arranged horizontally at a right angle to the fingers and are supported in this position by rods 24 which are welded to the fingers as shown at 25 in Figure 7, and extend longitudinally of the fingers. When in inoperative position the dogs extend downwardly from the fingers and they may be readily swung from one of their positions to the other position.

Chains 26 are looped over girders 27 above the terminal fingers of the series of fingers and the lower ends of these chains are connected to eyes 28 on the fingers, as best shown in Figures 2 and 3. These chains limit downward movement of the fingers past the horizontal. The fingers may be swung upwardly to lie against the girders out of the way when it is necessary to use traveling blocks.

Each dog 22 is preferably formed of strap metal and has a twist 29 formed therein so that the free end 30 of the dog extends in a plane at a right angle to the shank of the dog and thus is pressed properly, as best shown in Figure 1, to latch each pipe as it is placed in the pipe rack between the fingers. However, only a pair of the dogs on each finger may be used when it is desired to latch a number of pipes simultaneously instead of latching each pipe as it is placed in the pipe rack.

The brackets 13 are secured to the legs 10 of the derrick by J-bolts 31, best shown in Figure 1, which hook over one flange of the angle iron leg. A strap 32 overlaps the edge of the opposite flange and is bolted to the flange as shown at 33.

From the above description it is thought that the construction and operation of the invention will be fully understood without further explanation.

What is claimed is:

1. In a pipe rack for oil derricks, the combination with a derrick, of a horizontally disposed shaft journaled at its opposite ends upon the derrick and provided with laterally extending uniformly spaced fingers, means to limit the turning movement of the shaft to dispose the fingers in a horizontal plane, and dogs uniformly spaced along the fingers and pivotally mounted thereon for swinging movement through an arc of at least 270°, the fingers having means to limit the movement of the dogs to horizontal positions when their free ends will be adjacent those fingers next those on which they are mounted.

2. In a pipe rack for oil derricks, the combination with a derrick, of a horizontally disposed shaft journaled at its opposite ends upon the derrick and provided with laterally extending fingers arranged for the reception of pipe sections between them, the fingers being spaced according to the diameter of the pipe sections, and dogs mounted upon the fingers and uniformly spaced therealong according to the diameter of the pipe sections, so that adjacent fingers and any pair of intervening adjacent dogs define a single pipe section receiving space, the dogs being pivotally mounted on the fingers to swing into and out of obstructing positions to pipe sections received between the fingers.

3. In a pipe rack for oil derricks, the combination with a derrick, of a horizontally disposed shaft journaled at its opposite ends upon the derrick and provided with laterally extending uniformly spaced fingers, means to limit the turning movement of the shaft to dispose the fingers in a horizontal plane, dogs uniformly spaced along the fingers and pivotally mounted thereon for swinging movement through an arc of at least 270°, and rods laid laterally against the fingers and secured thereto to engage and limit the movement of the dogs to horizontal positions when their free ends will be adjacent those fingers next those on which they are mounted.

4. In a pipe rack for oil derricks, the combination with a derrick, of a horizontally disposed shaft journaled at its opposite ends upon the derrick and provided with laterally extending uniformly spaced fingers, means to limit the turning movement of the shaft to dispose the fingers in a horizontal plane, the fingers being reduced in diameter at uniformly spaced points, loosely mounted sleeve members received in said reduced portions of the fingers, dogs carried by and projecting radially from the sleeves to bridge the spaces between fingers when horizontally disposed, and rods laid laterally against and secured to the fingers and crossing the sleeves to act as stops to limit the dogs to horizontal positions, the dogs being swingable away from the rods to lie in planes perpendicular to the plane of the fingers.

THOMAS J. UMPHRES.